Patented Nov. 23, 1926.

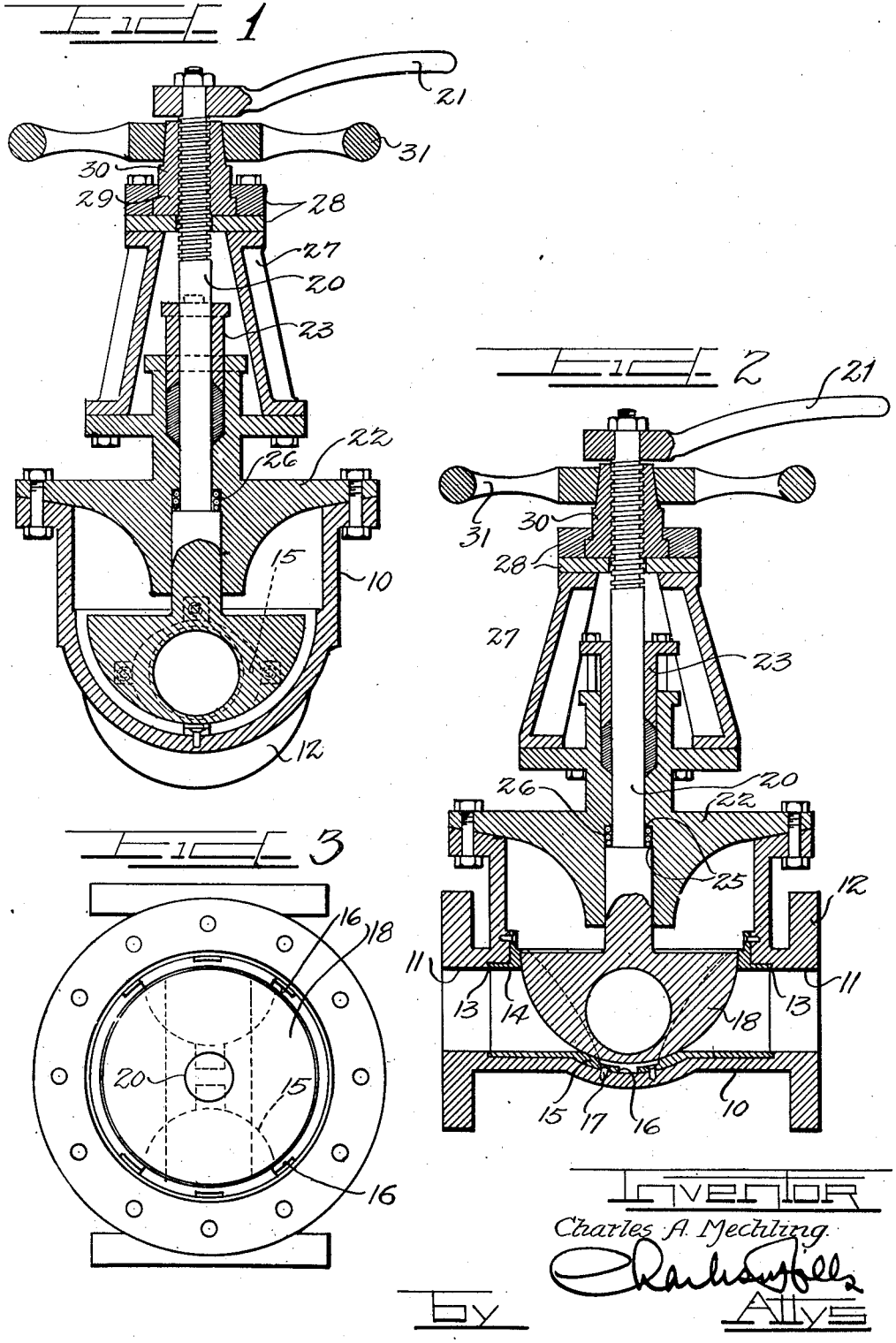

1,608,412

UNITED STATES PATENT OFFICE.

CHARLES A. MECHLING, OF TULSA, OKLAHOMA.

BALL-SEAT GATE VALVE.

Application filed July 19, 1924. Serial No. 726,969.

This invention relates to a quick operating combined gate and plug valve especially adapted for severe service under high pressures and hot liquids.

It is an object of this invention to provide a hemispherical apertured valve ball having both an axial and a rotating movement, together with inserted segmental valve seats having apertures aligned with inlet and outlet passages of the valve body. The provision of a hemispherical valve eliminates the accumulation of foreign particles on the seats and in the eddy spaces necessary in a conventional gate valve, and also entirely eliminates resistance to opening and closing thereof such as is commonly experienced with wedge gate tapered or plug valves wherein the contacting surfaces become stuck or locked due to the wedging action thereof.

It is a further object of this invention to provide an improved valve mechanism wherein the actual opening and closing of the valve is performed by a quarter turn of an operating handle while the sealing of the valve against leakage is accomplished by an auxiliary apparatus adapted to relieve the valve seal from pressure when rotating the valve.

Other and further important objects of this invention will be apparent from the disclosures in the drawings and specification.

The invention (in a preferred form) is illustrated on the drawings and hereinafter more fully described.

On the drawings:

Figure 1 is a section at right angles to the pipe line of a valve embodying the features of this invention, the valve being shown in open position.

Figure 2 is a section of the valve on the axis of the pipe line, showing the valve closed.

Figure 3 is a top view of the valve body with the valve in place and the bonnet removed.

As shown on the drawings:

A valve body is indicated by the numeral 10, inlet and outlet passages 11 being shown, together with suitable flanges 12 for bolting to the pipe flanges when assembling into a line of pipe. The body may be made of cast iron, forged steel, brass or the like according to the service the valve is intended for. The interior of the body in line with the passages 11 is counterbored to provide overhanging shoulders 13, separate sleeves 14 being inserted in each of the counterbores with edges mating with the shoulders 13. These sleeves are provided each with a flange 15 having a spherical surface forming the valve seat proper, and are retained in place by lugs 16 and set screws 17, the lugs being of less thickness than the flanges 15. A hemispherical valve member 18 is ground to a perfect seat on the flanges 15 and is apertured at 19 in line with the passages 11 so that with the valve open straight a clear passage exists through the valve body without any enlargement to form eddies which would result in the deposition of foreign matter therein which would score the valve and eventually cause leakage thereof. A stem 20 is formed integral with the valve member and is threaded adjacent its upper end, a handle 21 being provided above the threads.

By reference to Figure 2, it will be seen that the lower adjacent ends of said flanges 15 are projected into immediate proximity to each other to form a support in the vertical line thrust of said valve member.

A bonnet 22 is preferably given a ground joint with the valve body, and is provided with a suitable packing gland 23 around the stem 20. The bonnet and stem are provided with spaced shoulders 25 due to enlargements of the stem and the aperture therefor in the bonnet, and seating rings 26 are inserted between these shoulders to reduce the friction therebetween when opening or closing the valve.

The bonnet is provided with an upstanding yoke 27 carrying a two part housing 28 providing retaining flanges for a shoulder 29 on a nut 30 threaded on the stem 21, a hand wheel 31 being engaged about the nut for rotation thereof.

In the operation of opening the valve the handwheel 31 is first rotated sufficiently to loosen or free the valve member 18 from the valve seat flanges 15, whereupon a quarter turn of the handle 21 serves to turn the valve member until the aperture therein is on line, whereupon the handwheel may be tightened to seal the valve member against the flanges 15 to insure against sediment leaking into the valve body. To close the valve the sequence of operations is reversed. It will be evident that this structure provides a valve that is sealed in both open and closed positions against the line pressure, so that leakage into the valve body is obviated and the valve stem packing is subject to pressure only at the times the valve is being opened and closed.

I am aware that numerous details of construction may be varied through a wide range without departing from the principles of this invention, and I therefore do not purpose limiting the patent granted otherwise than necessitated by the prior art.

I claim as my invention:

A valve comprising a body having alined apertures therethrough and an open top, a removable closure for said top, oppositely disposed sleeves insertible through said open top and formed on their adjacent ends into inclined valve seats, a valve member having a through aperture adapted in one position to register with said body apertures and seating on said valve seats, the lower adjacent ends of said seats being projected into immediate proximity to each other to form a support in the vertical line of thrust of said valve member, and means in said top closure for axially and angularly moving said valve member.

In testimony whereof I have hereunto subscribed my name.

CHARLES A. MECHLING.